(12) United States Patent
Venkiteswaran (10) Patent No.: US 7,356,641 B2
(45) Date of Patent: Apr. 8, 2008

(54) DATA MANAGEMENT IN FLASH MEMORY

(75) Inventor: Sreekrishnan Venkiteswaran, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 11/039,089

(22) Filed: Jan. 19, 2005

(65) Prior Publication Data

US 2005/0132129 A1    Jun. 16, 2005

Related U.S. Application Data

(63) Continuation-in-part of application No. 09/940,708, filed on Aug. 28, 2001, now abandoned.

(51) Int. Cl.
*G06F 12/00* (2006.01)
*G06F 13/00* (2006.01)

(52) U.S. Cl. .................. 711/103; 711/100; 711/154

(58) Field of Classification Search ............. 711/100, 711/103, 108, 133, 154, 185.33, 218
See application file for complete search history.

(56) References Cited

U.S. PATENT DOCUMENTS

| | | | |
|---|---|---|---|
| 5,113,523 A | | 5/1992 | Colley et al. |
| 5,404,485 A | | 4/1995 | Ban |
| 5,577,224 A | * | 11/1996 | DeWitt et al. ............... 711/118 |
| 5,602,987 A | * | 2/1997 | Harari et al. ................. 714/8 |
| 5,752,261 A | * | 5/1998 | Cochcroft, Jr. ............. 711/133 |
| 5,933,847 A | | 8/1999 | Ogawa |
| 6,000,006 A | * | 12/1999 | Bruce et al. ................. 711/103 |
| 6,460,122 B1 | | 10/2002 | Otterness et al. |
| 6,813,693 B2 | * | 11/2004 | Chilimbi .................... 711/137 |
| 6,826,177 B1 | * | 11/2004 | Chan et al. .................. 370/352 |
| 2002/0073276 A1 | | 6/2002 | Howard et al. |
| 2002/0091895 A1 | | 7/2002 | Haines et al. |
| 2002/0097594 A1 | * | 7/2002 | Bruce et al. .................. 365/49 |
| 2002/0166022 A1 | | 11/2002 | Suzuki |
| 2003/0005233 A1 | * | 1/2003 | Stewart et al. ............... 711/136 |
| 2004/0083341 A1 | * | 4/2004 | Robinson et al. ........... 711/133 |
| 2006/0136656 A1 | * | 6/2006 | Conley et al. .............. 711/103 |

OTHER PUBLICATIONS

Al-Zoubi, Hussein, "Performance Evaluation of Cache Replacement Policies for the SPEC CPU2000 Benchmark Suite". ACM. 2004. pp. 267-272.*

* cited by examiner

*Primary Examiner*—Tuan V. Thai
(74) *Attorney, Agent, or Firm*—Scully, Scott, Murphy & Presser, P.C.; William H. Steinberg, Esq.

(57) ABSTRACT

A method is disclosed for emulating a disk drive on flash memory, thus enabling one or more file-systems to be resident on flash memory. A list of data structures is maintained corresponding to certain sectors resident on flash memory. Certain characteristics of data access to those sectors are recorded and a weightage value is dynamically computed, which is used to select those sectors that remain cached. This weightage value is calculated so that it minimizes erases and speeds up writes to flash memory and also automatically detects flash memory sectors that hold critical meta-data information or frequently accessed files and gives preferential treatment to those sectors. The number of sector caches available to the device driver is configured depending on the memory available in the system.

9 Claims, 8 Drawing Sheets

FIG. 4 sc_info is_pinned
sector_weightage
num_sector_switches
bank_number
sector_number
sector_size
next_sector_cache
sector_cache_address

DATA MANAGEMENT IN FLASH MEMORY

RELATED APPLICATIONS

This application is a continuation-in-part application of U.S. application Ser. No. 09/940,708, filed Aug. 28, 2001 now abandoned.

FIELD OF THE INVENTION

The present invention relates to the use of flash memory as a data storage device and relates particularly though not exclusively to improved techniques of data management using flash memory, especially when the flash memory is accessed from the operating system of an embedded device for which the flash memory acts as a data storage device.

BACKGROUND

The contents of flash memory are updated following a preceding sector erase of the relevant area. Conventional storage mediums do not generally require such erasures. Accordingly, there is a findamental incompatibility in the use of flash memory as a data storage medium with computer systems using conventional operating systems.

One method for storing data on flash memory is disclosed in U.S. Pat. No. 5,404,485 entitled "Flash File System", issued to Ban. In this case, a virtual mapping system is provided that allows data to be continuously written to unwritten physical address locations. The method used by Suzuki (US 2002/0166022 A1) also uses logical to physical address mappings. When virtual or logical memory maps are used, the use of standard file-system utilities to debug/repair the stored file-system is precluded when the file-system data is uploaded from an embedded device that uses flash memory and is moved to a customer support site. The method described as part of Ogawa (U.S. Pat. No. 5,933,847) uses the Least Recently Used (LRU) algorithm to select cached sectors that can be freed. This will not be optimal in many cases when flash memory emulates a disk drive in an embedded device. Also, these techniques do not automatically detect critical meta-data sectors and offer them persistent storage or preferential treatment.

In view of the above, a need exists for a manner of managing data in flash memory that addresses certain limitations of prior art.

SUMMARY

Embedded devices typically have flash memory banks for permanent storage. The present invention provides a method for emulating a disk drive on flash memory, thus enabling one or more file-systems to be resident on flash memory. A list of data structures is maintained corresponding to certain sectors resident on flash memory. Certain characteristics of data access to those sectors are recorded and a weightage value is dynamically computed, which is used to select those sectors that can remain cached. This weightage value is algorithmically calculated so that it will minimize erases and speed up writes to flash and also automatically detect flash sectors that hold critical meta-data information or frequently accessed files and gives preferential treatment to those sectors.

No allocation data structures need to be stored on flash memory. One can upload the embedded flash file-system image to an external host machine and use standard file-system utilities to debug/repair the file-system on the host machine.

The described techniques are implemented as a device driver for a flash memory device. Data is written onto the sector caches rather than the flash-disk, and depending on the dynamically calculated sector weightage, swapped back and forth between the sector caches and flash memory sectors, on demand.

DETAILED DESCRIPTION

A method, device driver and computer system are described for providing an advantageous scheme for accessing (reading from and writing to) the contents of flash memory from a computer operating system. A device driver essentially converts the more general input/output instructions of the operating system installed on the computer to messages that the device can interpret, to allow the device and the operating system to communicate with each other. In this case, a flash memory is a device intended to be attached to a computer, so that a described device driver can be installed in the operating system to allow the flash memory to act as a data storage medium for the computer.

Flash memory is normally organized into banks and further into sectors. Erases of selected portions of the flash memory are performed at the granularity of individual sectors. A flash-write to a location is preceded by a corresponding flash-erase.

The flash-disk device driver maps all the flash banks into memory that is virtually contiguous, i.e., the banks are mapped adjacent to one another in virtual memory.

Since the described algorithm is implemented at the device driver level, it is transparent to the file-system layer of the operating system. The algorithm assumes that the embedded operating system uses file-system buffer caching algorithms, such as those generally used by UNIX operating systems. The algorithm is based on caching flash sectors depending on a dynamically calculated weightage value based on the characteristics of data access to those sectors.

Terminology

A brief description of terminology used herein is given below.

Flash memory: A type of non-volatile memory which is an electrically erasable and programmable read-only memory (EEPROM) having a programmable operation, which allows for the erasure of blocks of memory.

Flash-disk: The area in flash memory that is available for use to emulate a disk.

Flash-disk driver: The block device driver for the flash-disk. The algorithm described in this discussion is implemented by the flash-disk block driver.

Flash-disk sector: A physical sector in the flash-disk.

Sector cache: A cached copy of a flash-disk sector, maintained by the flash-disk driver. A sector cache can be pinned or unpinned.

Sector cache list: A linked list consisting of the sector caches maintained by the flash-disk driver.

Sector switch: A flash write requires a sector switch if the previous write was not done to the same flash sector.

Minor devices: Instances of the flash-disk driver—there is one instance per file-system resident on the flash-disk.

Buffer-cache: A layer of software present in UNIX systems, that reside between the file-system and the device driver. Read and write requests from the buffer-cache to the disk are normally issued in terms of file-system blocks of data.

Sync: An operation that flushes the dirtied blocks in the buffer-cache to the disk. The "sync" (for synchronization) operation might be done at periodic intervals, but definitely during system shutdown. Writes to the disk may also occur when the buffer cache gets shrunk when the system runs low on memory.

Super-block: The portion of the file-system that contains meta-data information.

Sector Caching

The flash memory device driver maintains a linked list of sector caches. The number of sector caches available to the flash memory driver is configured depending on the memory available in the system. Data is written onto the sector caches, rather than the flash-disk device, and depending on a dynamically calculated weightage value, swapped back and forth between the sector caches and flash memory sectors, on demand.

When the flash-disk driver needs to write to a flash sector, it first sees if the sector is already available in the sector cache list. If the sector is available, the write is done onto the corresponding sector cache. If the sector is not available, and if there is a free sector available in the cache list, that free sector is populated with the corresponding flash sector contents and the write is done onto this sector cache. If the sector is not available and there are no free sector caches in the list, a sector cache has to be selected to be freed, by swapping the contents of the selected sector cache back to the flash-disk.

A sector weightage is dynamically assigned to each sector that is cached. This count is incremented whenever there is a write access to a file-system block within this sector cache, if the block has not already caused the sector weightage to be incremented. This can be tracked by using one bit per file-system block present in the sector. All tracking bits are initially reset. Whenever a block is written to, the corresponding bit is set. As will be explained later, these tracking bits will be reset and the sector weightage set to one greater than the maximum sector weightage of all cached sectors, when the algorithm determines that this sector has suffered sector switches greater than a pre-calculated threshold value.

A sector cache that is marked as "pinned", cannot be swapped back to disk and reused (as described below in the section entitled "Pinning a sector cache"). Among the other sector caches, the cache that has the minimum sector weightage is selected to be swapped out to the flash-disk. A flash-disk will typically be used as a storage medium in small embedded devices. While the program binaries stored in these devices (which are read-only) could be large in size, the files that the user wishes to modify will be usually relatively small in size. So a sector could be holding multiple write-able files. If more blocks in a sector cache have been modified, it generally means that more files resident on that sector have been modified—and at least one of them might be accessed again in the near future.

When a sector cache is to be swapped-out to flash-disk, the corresponding sector in the flash-disk is erased and rewritten with the sector cache's contents. The data in the flash-disk sector for which the write request has been received, is then swapped-in to this sector cache. Since this sector cache now contains the most recently used file-system block in the flash-disk, we reward it with an advantage by setting its sector weightage and number of sector switches equal to that of the sector cache that has the minimum sector weightage among all other sector caches.

Automatically Detecting Sectors Holding Meta-Data

Whenever a file gets written to disk from the Operating System buffer cache (usually during a sync), meta-data information for the file is updated in the file-system super-block. The sector(s) containing the super block are usually the most frequently accessed sectors in the flash-disk. The meta-data sectors thus have more number of sector switches (a sector cache write is said to require a sector switch, if the previous write was not done to the same sector cache), and the number of modified blocks during each such switch is less (since the space required for meta-data for a file is usually less).

Whenever the number of sector switches to a sector cache reaches a threshold, the sector weightage for that sector cache is set to one greater than the maximum sector weightage of all the cached sectors. When the threshold is reached, the number of sector switches for the sector cache is also reset to zero. This means that, this sector cache will enjoy an advantage compared to other sector caches for subsequent swap decisions, since a sector cache with the least sector weightage is swapped-out first.

If the sector weightage of a sector is greater than all other sectors, the sector cache can remain in the sector cache list, until the sector weightage, becomes less than the sector weightage of all other sector caches. Thus, when a sector cache demonstrates the characteristics of a sector cache that holds meta-data information (that is, by having a large number of switches to the sector cache) the sector cache is rewarded with this advantage.

A sector that caches file-system data may have characteristics similar to a sector caching file-system meta-data, if the sector that caches file-system data contains a large number of very small files, many of which have been modified. Such sectors also get rewarded with the bonus sector weightage as long as they continuously get accessed. They will eventually get swapped-out to the flash-disk since only a sector that has continuous and frequent write accesses persists in the sector cache list.

Calculating the Sector Switch Threshold

The value of the sector switch threshold can be decided, taking into account, the size of a sector cache, the average size of write-able files in the embedded device, and other factors relevant to the device. So, an approximation for the threshold can be given by the mathematical expression $(T = K \times m/n)$ which expresses the mathematic product of K and $(m/n)$, in which T is the threshold for the number of switches to a sector, m is the size of the flash sectors, n is the average size of write-able files in the device and K is a constant numerical value. For smaller values of K, the calculated threshold is more conservative (that is, also smaller).

Pinning a Sector Cache

To guarantee the permanent presence of certain critical sectors in cache, those sectors can be pinned in memory. A pinned sector cache is not available for further swapping. It is permanently dedicated to the flash-disk sector that it is caching.

The file-system meta-data region normally resides in the initial portions of the file-system image. The size of this region depends on the particular file system that is used, the file-system size, the size of the flash sectors holding the initial portions of the file-system and the amount of memory used by the file-system in the first sector, if the file-system does not start on a sector boundary.

Multiple File-systems

Multiple file-systems can be accommodated on the flash-disk. The flash-disk driver is able to support multiple devices—one per file-system. That is, multiple flash-disks can be used in conjunction with a suitable computer system. In the terminology of UNIX operating systems, the multiple flash-disks are minor devices. In this case, the sector cache list data structure is global to all minor devices.

Figure 1:
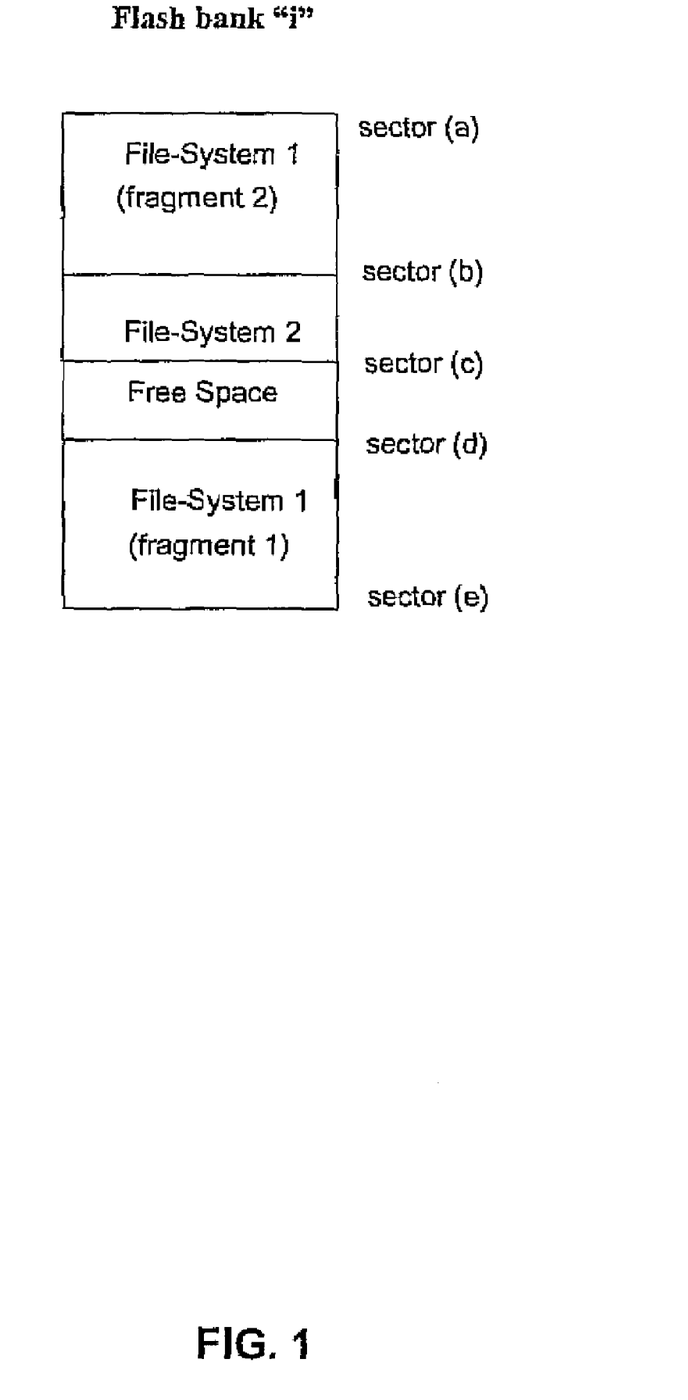
FIG. 1 is a schematic representation of a portion of a flash memory.

FIG. 1 is a schematic illustration of a portion of a flash-disk, with example contents as represented in FIG. 1. The flash memory comprises a number of banks, one of which (denoted "i") is represented in FIG. 1. The bank of the flash memory depicted in bank "i" comprises a number of sectors, indicated as sector (a) to sector (e) in this case. As indicated, sectors (a) to (b), and (d) to (e) contain file-system 1, with sectors (a) to (b) housing fragment 2 and sectors (d) to (e) housing fragment 1. Sectors (b) to (c) house file-system 2, while sectors (c) to (d) contain free space. FIG. 1 omits the offsets within the sectors, which are not shown for convenience and ease of representation.

Figure 2:
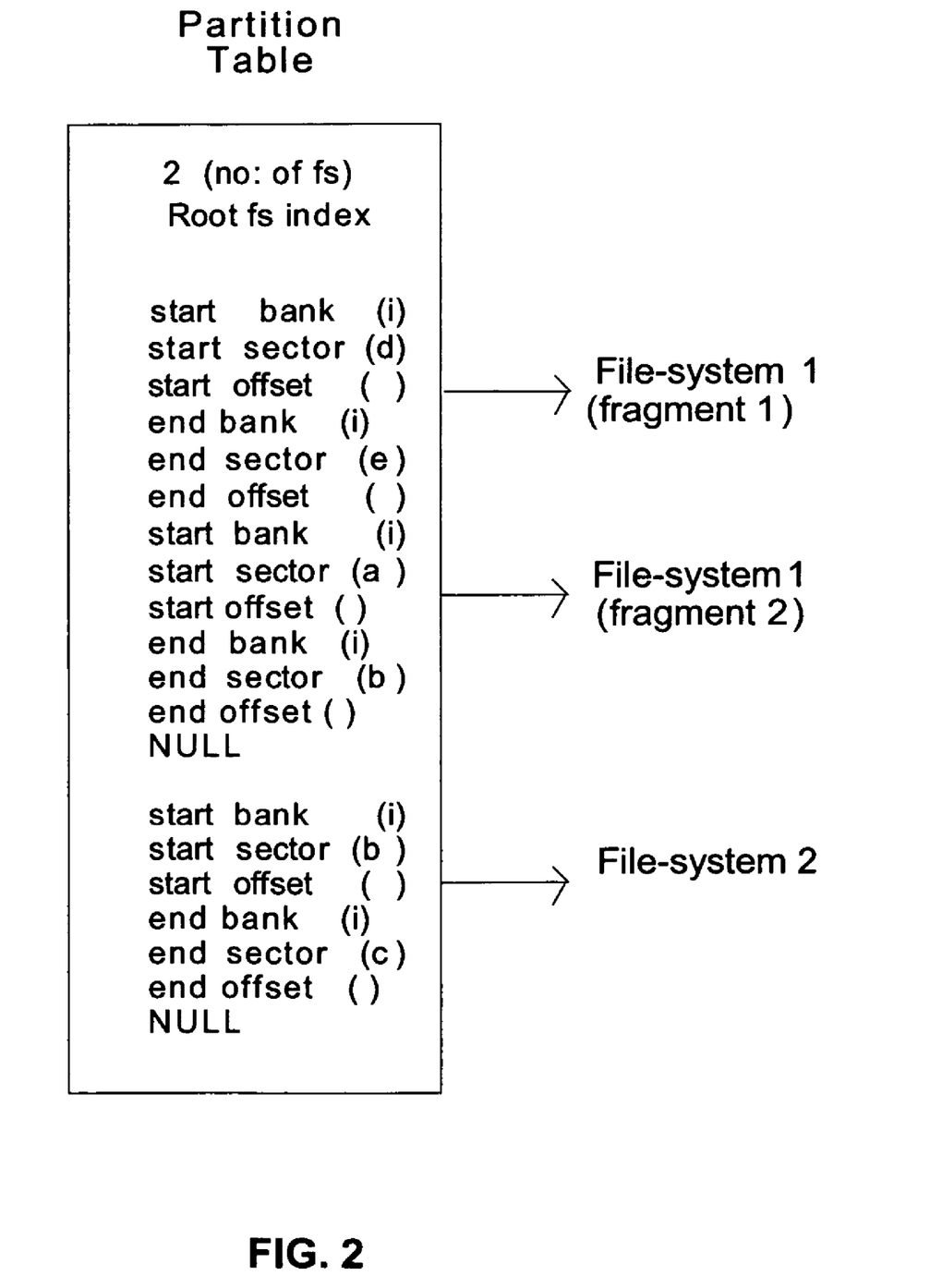
FIG. 2 is a schematic representation of a partition table for the portion of the flash-disk contents represented in FIG. 1.

FIG. 2 is a schematic representation of a partition table for the portion of the flash-disk contents represented in FIG. 1. The flash-disk partition information is stored in the partition table, elsewhere on the flash memory. As represented in FIG. 2, the partition area contains a set of null-terminated tuples. Each tuple set has the form: [(start bank i, start sector i, start offset i), (end bank i, end sector i, end offset i), . . . NULL], and represents different memory fragments on which the corresponding file-system resides. The tuple ordering reflects the fragment ordering. The number of resident file-systems and the index of the root file-system are also part of the partition table, as indicated in FIG. 2. FIG. 2 indicates that for the example given in FIG. 1, the number of resident file-systems is 2.

If multiple file-system fragments are present (as is the case in FIG. 2), the flash-disk device driver has to perform an extra translation on the offsets generated, to locate the correct physical bank, sector and sector offset. The translation to be done is calculated using the fragment tuple information present in the partition table of FIG. 2. Each minor device reads its corresponding file-system start address, from the appropriate tuple set in the partition area. The minor device corresponding to the root file-system index is mounted as the root device when the kernel boots up.

Procedure for Flash Writes

Figure 3A:
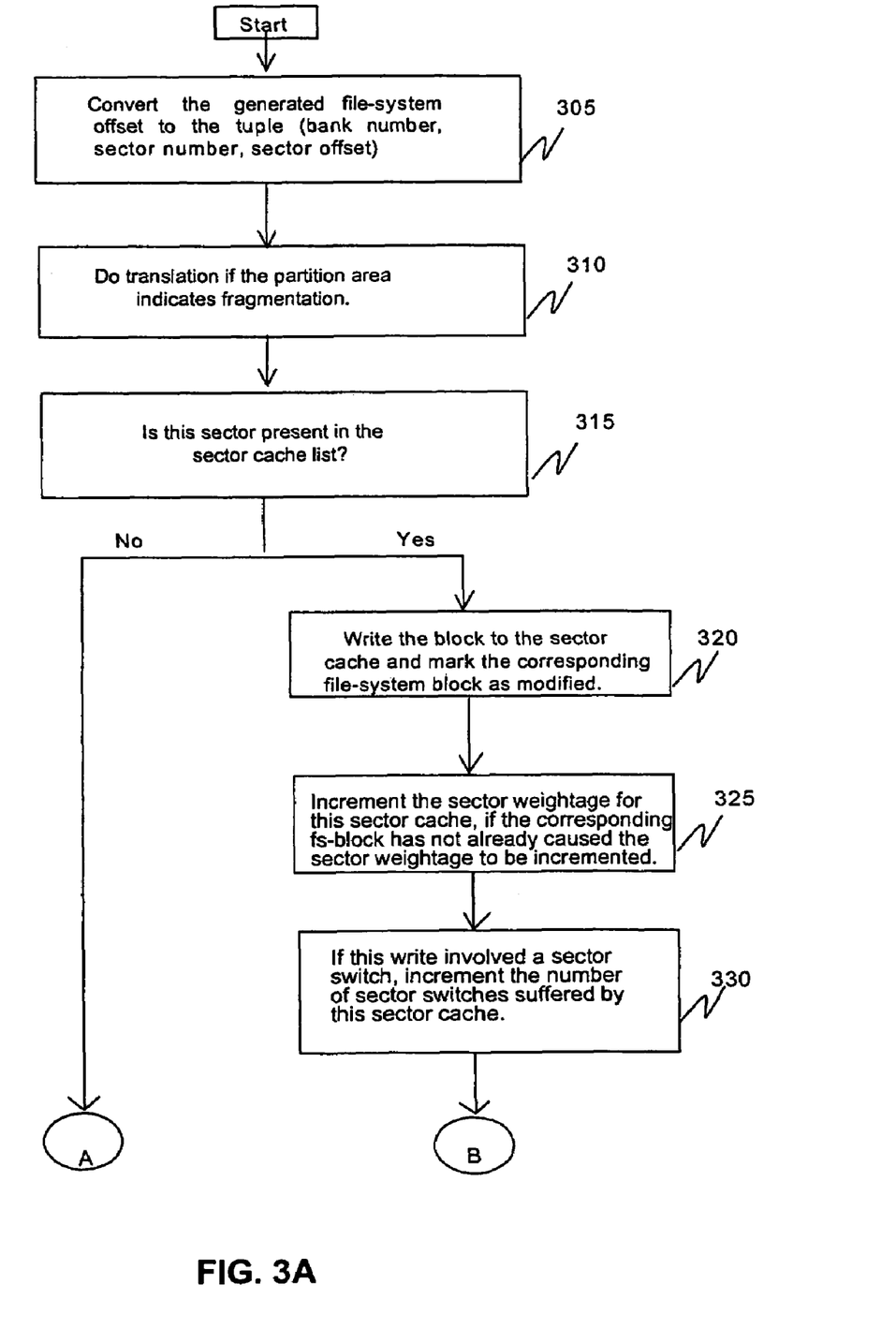
FIGS. 3A and 3B jointly represent a flowchart that describes steps involved in writing information to the flash memory.

When the flash-disk device driver receives a request to write a block of data (a write request), the driver performs a sequence of steps. These steps, and the algorithm governing these steps is described below with reference to FIGS. 3A and 3B, which jointly represent a flowchart that describes the steps for writing to flash-disk. The write request is serviced as follows:

1. Convert the generated file-system offset, to the tuple (bank number, sector number, sector offset) (step 305). If the file-system image is not contiguous in memory (refer to the section above entitled "Multiple file-systems"), perform the required extra translation (step 310).

2. Check if this sector is in the sector cache list (step 315).

3. If yes (that is, if the checked sector is in the sector cache list),
   (a) Write to the corresponding sector cache and flag the corresponding block as having already contributed to the sector weightage (step 320).
   (b) Increment the sector weightage for the sector cache, if that block has not already caused the sector weightage to be incremented. (step 325).
   (c) Increment the number of switches to this sector cache, if the previous write was not done onto the same sector cache. (Step 330).
   (d) If the number of sector switches has exceeded the pre-calculated threshold (refer to the section entitled "Calculating the Sector Switch Threshold"), set the sector weightage for this sector cache to one greater than the maximum sector weightage of all the sector caches and reset the number of sector switches for this sector cache to zero (steps 335 and 340). Also flag the file-system blocks in the said sector as unmodified irrespective of whether the contents of the blocks differ from the corresponding flash memory locations.

Figure 3B:
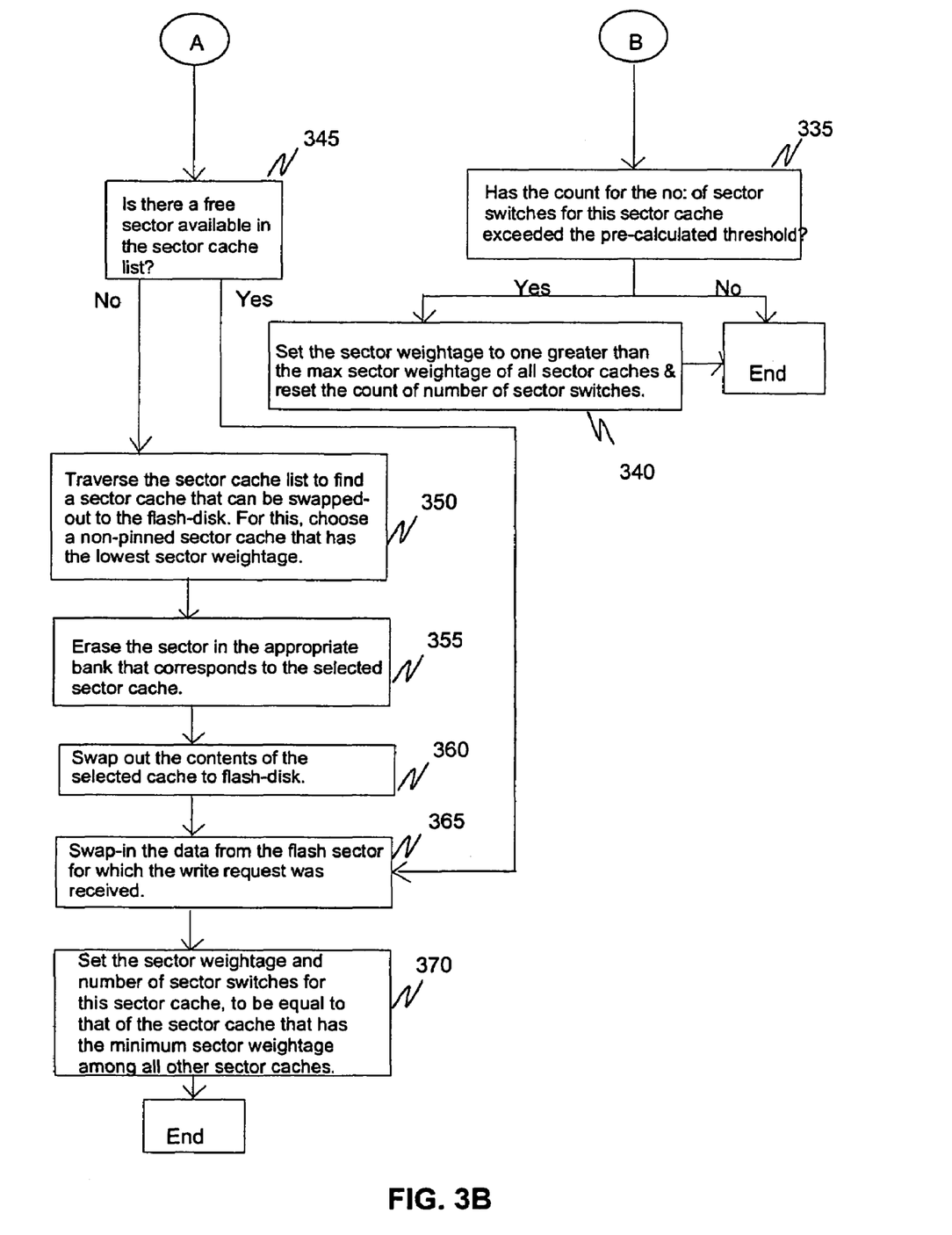

4. Else,
   (a) If there is a free sector cache in the sector cache list, select that sector cache (step 345).
   (b) Else,
   (1) Traverse the sector cache list to select a sector cache that can be swapped-out to the flash-disk. For this selection, choose a non-pinned sector cache, which has the lowest sector weightage (step 350).
   (2) Erase the selected sector (in the appropriate bank) that corresponds to the sector cache chosen in the previous step (step 355). (The erase/wait/write commands use the appropriate register locations in the corresponding bank).
   (3) Swap-out the contents of the selected sector cache to flash-disk (step 360).
   (c) Swap-in the data from the flash sector for which the write request was received, to the selected sector cache (step 365).
   (d) Set the sector weightage and the number of sector switches for this sector cache equal to that of the sector cache that currently has the minimum sector weightage among all the other sector caches. Also update data structure entries so that the swap out/in is appropriately reflected (step 370). (Refer to the section entitled "Implementation" in this respect).

Procedure for Flash Reads

When the flash-disk driver receives a read request for a block of data, it does the following:

1. Convert the generated file-system offset to the tuple (bank number, sector number, sector offset). If the file-system is not contiguous in memory (refer to the section entitled "Multiple file-systems"), perform the required extra translation.

2. Check if this sector is in the sector cache list.

3. If yes (that is, if the checked sector is in the sector cache list), read the data from the corresponding sector cache.

4. Else, read the data from the corresponding sector in the flash-disk.

The above sequence is as one would expect, and simply operates to access the most recent information recorded in memory, either in the flash memory or the associated cache.

Implementation

Figure 4:
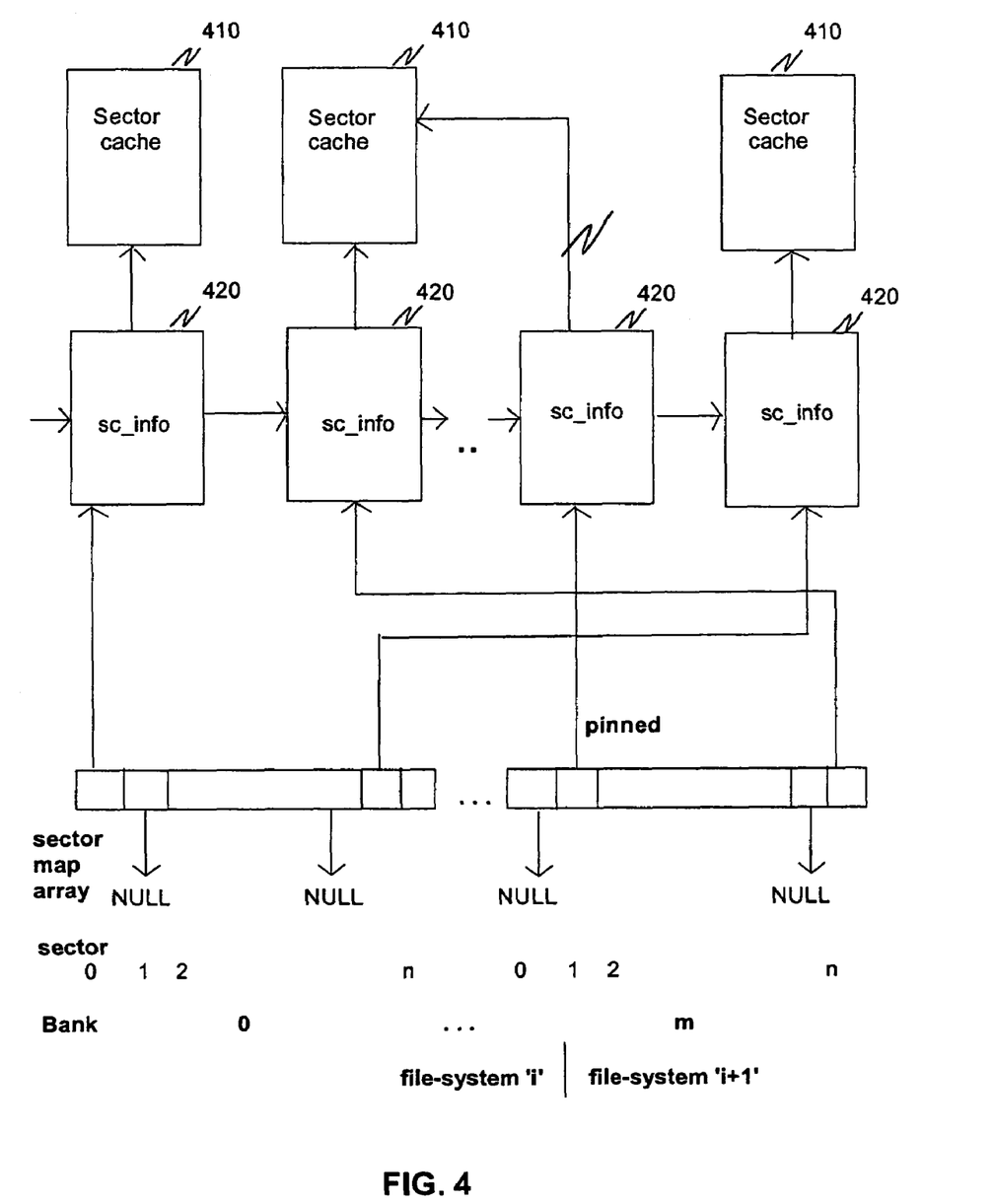
FIG. 4 schematically represents a sector map array for a sector cache, when stored and represented as a linked list.

FIG. 4 schematically represents a sector map array for the sector cache, stored and represented as a linked list. Each sector cache 410 has an associated sector cache information (sc_info) structure. This sector cache information (sc_info) structure 420 is represented in FIG. 4, with the field names represented in FIG. 5. The field names of the sector cache information (sc_info) structure are described in the list below.

Figure 5:
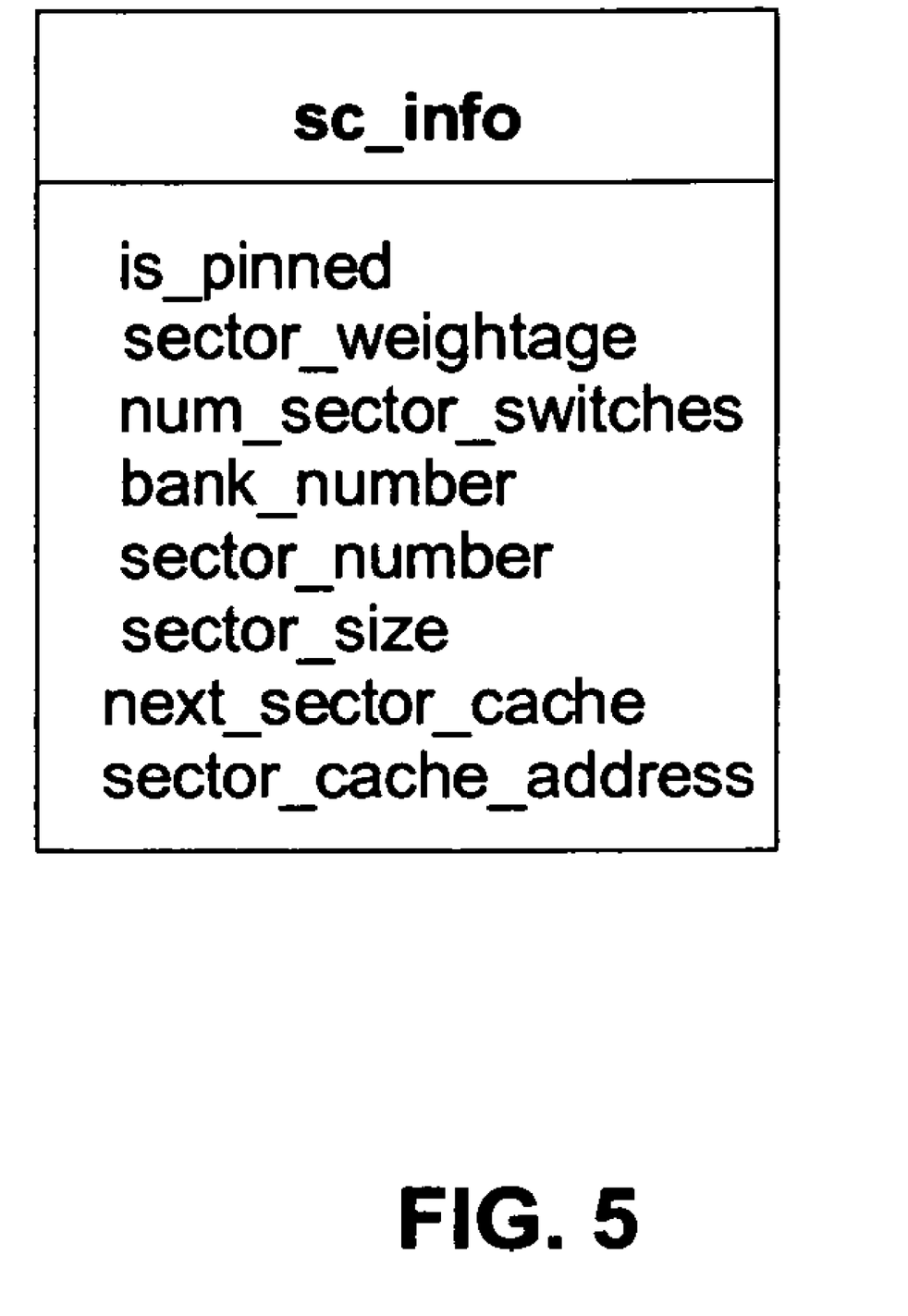
FIG. 5 is a representation of the field names of a sector cache information (sc_info) structure.

1. Sector cache weightage (sector_weightage)
2. Number of sector switches to this sector cache (num_sector_switch).
3. Whether the associated sector cache is pinned (is_pinned).
4. The corresponding bank number of the flash-disk sector that it is caching (bank_number).
5. The corresponding sector number of the flash-disk sector that it is caching (sector_number).
6. Size of this sector (sector_size).
7. Address of the next sector cache in the list (next_sector_cache).
8. Address of the sector cache (sector_cache_address).

A sector map array is also used, in which each entry (one per sector per bank) points to a sector cache in the above list if it is currently cached, or to NULL if it is not currently cached.

For a write operation to a flash sector, direct indexing is done onto the sector map array, to determine whether it is currently present in the sector cache list. If it is (that is, the corresponding entry in the map array is non-NULL), the corresponding sector cache is used for the flash write. Otherwise the sector cache information (sc_info) list is traversed in order to determine whether a free cache entry is available in the list (this is done by checking if a predetermined invalid value is found in the bank/sector number field of any sc_info element in the list). Also during this traversal, the address of the sc_info element with the lowest sector weightage is found and stored, provided that a free sc_info element has not been found. If the sector is not in the cache list and a free sc_info element is available in the list (as determined in the last step), the free entry is populated with the corresponding flash sector's contents and the flash-write is performed onto that sector. If there is no free cache element, the sc_info element with the lowest sector weightage (as determined in the last step) is selected to be swapped back to the flash-disk and thus the freed entry is populated with the corresponding flash-sector and the write is performed onto this sector. The corresponding sc_info element is updated with new values. The corresponding pointers in the map array for the old and new sector are also updated.

The size of the sector caches in memory is equal to the size of the largest sector in the flash-disk. The memory for the sector caches is allocated during initialization of the flash-disk driver. The number of sector caches in the list can be configured at compile-time of the flash-disk driver, keeping in mind the memory available to the operating system. If the flash memory has variable sized sectors, a sector cache can be shared by more than one smaller sector.

This algorithm operates satisfactorily under the assumption that the system is shutdown as intended. Under this assumption, further improvements can be effected, like kicking off a thread for the flash-disk sector erase, just after the sector cache is swapped-in (instead of erasing just before a swap-out). If the assumption of regular shutdowns does not hold, periodically flushing dirtied sector caches to the flash-disk adds some robustness.

Computer Hardware and Software

Figure 6:
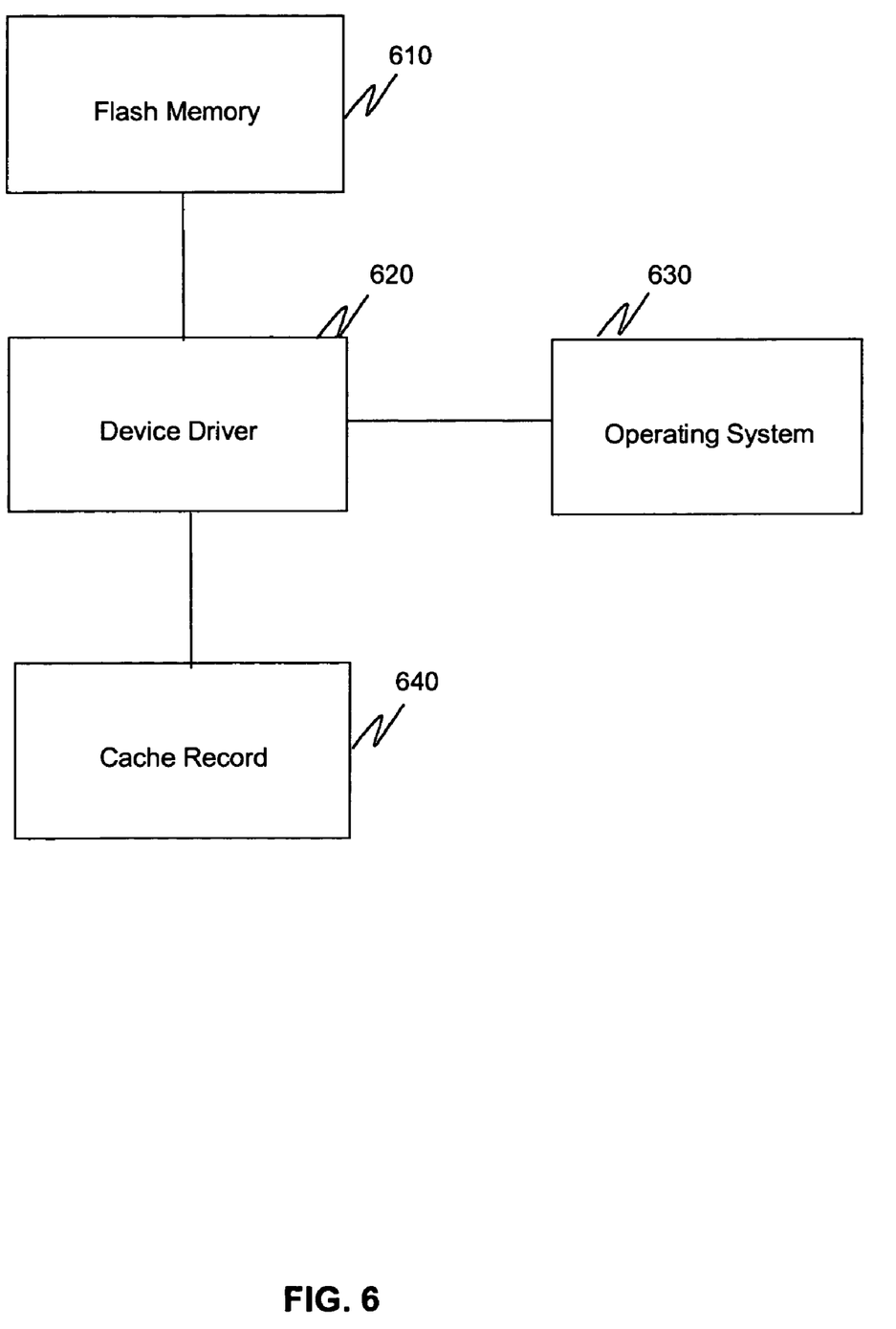
FIG. 6 is a schematic representation of the components that operate to allow access to flash memory as a storage medium.
Figure 7:
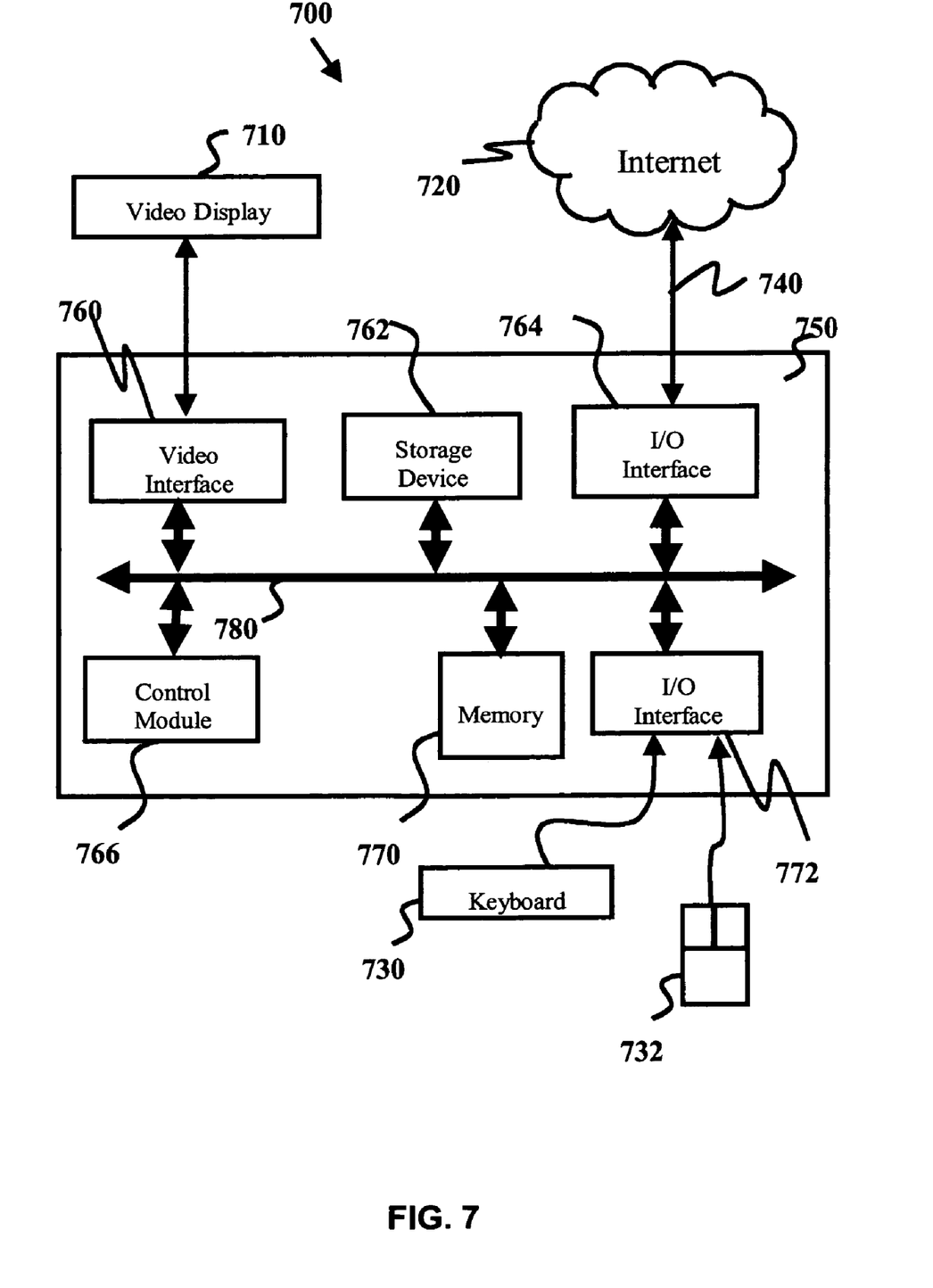
FIG. 7 is a schematic drawing of a computer system, which can be used to host the components of FIG. 6.

FIGS. 6 and 7 jointly represent aspects of the implementation of the above described techniques and arrangements. FIG. 6 is a schematic representation of the components that operate with the assistance of a host computer system to allow the computer system to be used to access the flash memory 610 as a storage medium. The flash memory 610 interacts with a device driver 620, being software code installed in an operating system 630, to access the flash memory 610. The operating system 630 interacts with both the device driver 620 and an associated sector cache record 640, in the manner described above, in order to interact with the flash memory 610 in the described manner.

The above-described technique can be implemented using a device driver 620 in conjunction with an operating system 630 installed and executing on a host computer system 700.

FIG. 7 is a schematic representation of such a host computer system 700. The computer system 700 includes a computer 750, a video display 710, and input devices 730, 732. The computer system 700 can have any of a number of other output devices including line printers, laser printers, plotters, and other reproduction devices connected to the computer 750. The computer system 700 can be connected to one or more other similar computers via a communication input/output (I/O) interface 764 using an appropriate communication channel 740 such as a modem communications path, an electronic network, or the like. The network may include a local area network (LAN), a wide area network (WAN), an Intranet, and/or the Internet 720, as represented.

The computer 750 includes the control module 766, a memory 770 that may include random access memory (RAM) and read-only memory (ROM), input/output (I/O) interfaces 764, 772, a video interface 760, and one or more storage devices generally represented by the storage device 762. The control module 766 is implemented using a central processing unit (CPU) that executes or runs a computer readable software program code that performs a particular function or related set of functions.

Each of the elements in the computer system 750 is typically connected to other devices via a bus 780 that in turn can consist of data, address, and control buses. The video interface 760 is connected to the video display 710 and provides video signals from the computer 750 for display on the video display 710. User input to operate the computer 750 could be provided by one or more of the input devices 730, 732 via the I/O interface 772. For example, a user of the computer 750 can use a keyboard as I/O interface 730 and/or a pointing device such as a mouse as I/O interface 732. The keyboard and the mouse provide input to the computer 750.

The storage device 762 can consist of one or more of the following: a floppy disk, a hard disk drive, a magneto-optical disk drive, CD-ROM, magnetic tape or any other of a number of existing non-volatile storage devices. The flash disk or flash memory 610 is included as a storage device accessed through a respective device driver.

The software may be stored in a computer readable medium, including the storage device 762, or downloaded from a remote location via the interface 764 and communications channel 740 from the Internet 720 or another network location or site.

The computer system 700 includes the computer readable medium having such software or program code recorded such that instructions of the software or the program code can be carried out.

The computer system 700 is provided for illustrative purposes and other configurations can be used. The foregoing is merely an example of the types of computers or computer systems with which the described techniques and arrangements may be performed. The driver 620 is resident as a software component (such as an executable file, or dynamic link library). Intermediate storage of the program code of the device driver 620 and any data including entities, tickets, and the like may be accomplished using the memory 770, possibly in conjunction with the storage device 762.

In some instances, the device driver 620 may be supplied encoded on a CD-ROM or a floppy disk (both generally depicted by the storage device 762), or alternatively could be read by the user from the network via a modem device connected to the computer 750. Still further, the computer system 700 can load the device driver from other computer readable media. This may include magnetic tape, a ROM or integrated circuit, a magneto-optical disk, a radio or infra-red transmission channel between the computer and another device, a computer readable card such as a PCMCIA card, and the Internet 720 and Intranets including email transmissions and information recorded on Internet sites and the like. The foregoing are merely examples of relevant computer readable media. Other computer readable media may be used as appropriate.

The device driver 620, as a computer program, includes an expression, in any language, code or notation, of a set of instructions intended to cause a system having an information processing capability to perform a particular fiction on interacting with a respective associated device, either directly or after either or both of the following: a) conversion to another language, code or notation or b) reproduction in a different material form.

Overview

The described technique relates to an algorithm for emulating a disk in flash memory. The design aims to minimize erases and writes to the flash and thus speed up flash writes and increase flash life. This is a solution at the device driver level and is transparent to the file-system. This technique defines a policy to make use of a list of sector caches to buffer accesses to the flash-disk by recording certain characteristics of data access to the file-system blocks constituting the cached sectors, and dynamically calculating a weightage value. The technique also implements a procedure that automatically detects sectors that hold critical meta-data information or frequently accessed files, and gives preferential treatment to those detected sectors.

While various techniques and arrangements are described in the context of flash memory, the described techniques and arrangements relate more broadly to any memory medium having similar write, read, and erase characteristics as flash memories.

What is claimed is:

1. A method of managing memory contents of a flash memory having a plurality of memory sectors that are erased before being rewritten, the method comprising the steps of:

caching selected memory sectors that hold file-system blocks, computing a sector weightage for each cached memory sector that is used to determine which memory sectors remain cached, said sector weightage being dependent upon a record of characteristics of data accesses to the memory sector including a combination of a number of sector switches suffered by the cached memory sector and the number of modified file-system blocks presented in the cached memory sector, and dynamically recomputing said sector weightage;

maintaining a record for each cached memory sector, of the number of sector switches suffered by the cached memory sector, that represent instances where a previous data write did not occur to a file-system block in the cached memory sector.

2. The method as claimed in claim 1, further including the step of incrementing said sector weightage for a cached memory sector whenever there is a write access to a file-system block within the cached memory sector, provided the file-system block has not already caused the sector weightage to be incremented.

3. The method as claimed in claim 1, farther including the step of incrementing the number of sector switches in a cached memory sector after writing data to the cached memory sector, if said step involved a sector switch.

4. The method as claimed in claim 1, farther including The step of calculating a predetermined threshold number of sector switches, that is dependent on the size of the flash memory sectors and the average size of write-able files in the embedded device that uses the flash memory for data storage.

5. The method as claimed in claim 4, further including the step of setting the sector weightage of a cached memory sector to one greater than the maximum sector weightage of all the cached memory sectors, and flagging all file-system blocks in said memory sector as unmodified, irrespective of whether the contents of the file-system blocks in the cached memory sector are different from the corresponding flash memory locations, once the recorded number of sector switches for the said cached memory sector exceeds the predetermined threshold number of sector switches.

6. The method as claimed in claim 1, further including the step of resetting to zero a recorded number of sector switches for a cached memory sector once the number of sector switches for the cached memory sector exceeds a predetermined threshold number of sector switches.

7. A method of managing data in flash memory having a plurality of memory sectors that are erased before being rewritten, comprising the steps of:

caching selected memory sectors;

receiving a write request to perform a write operation in a memory sector;

computing, for each cached memory sector, a sector weightage that is used to determine which memory sectors remain cached, wherein the sector weightage is dependent upon a record of characteristics of data accesses to the memory sector;

writing the data to a sector cache corresponding to the memory sector of said received write request, if the stored memory sector subject of said received write request is already stored in the sector cache; and writing the data to an available free sector cache if the memory sector of said received write request is not already stored in a sector cache wherein if the memory sector of said received request is not stored in a sector cache and if there is not an available free sector cache, said method further including the steps of:

selecting an unpinned cached stored memory sector on the basis of the sector cache that currently has the lowest calculated sector weightage of all the sector caches;

setting the sector weightage and number of sector switches for the selected sector cache to be equal to that of a sector cache that currently has the minimum sector weightage among all other sector caches;

erasing the selected sector from the flash memory and writing the contents of the corresponding sector cache to said selected memory sector; and reading the contents of the memory sector for which the write request was received, into the selected sector cache and writing the requested data onto the selected sector cache.

8. The method as claimed in claim 7, further including globally calculating and recording said sector weightage and the number of sector switches so as to simultaneously support multiple file-systems on the flash memory.

9. The method as claimed in claim 7, further including automatically detecting and caching memory sectors holding critical meta-data information or frequently accessed files.

* * * * *